Sept. 4, 1934. W. F. OLIVER 1,972,829
HYDRAULIC BRAKE
Filed Jan. 10, 1930
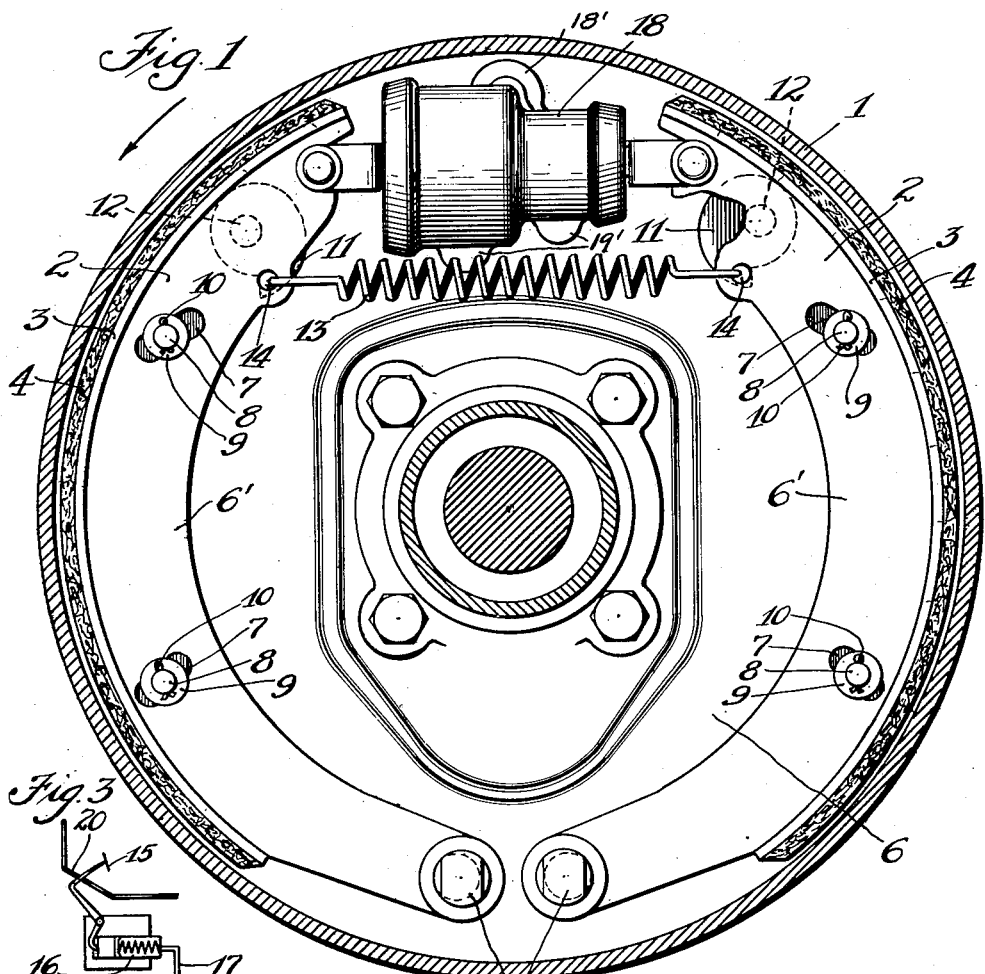
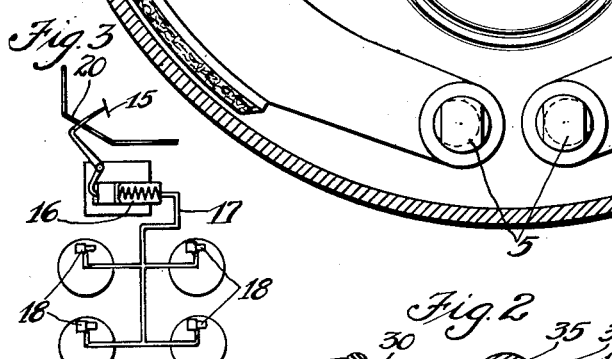
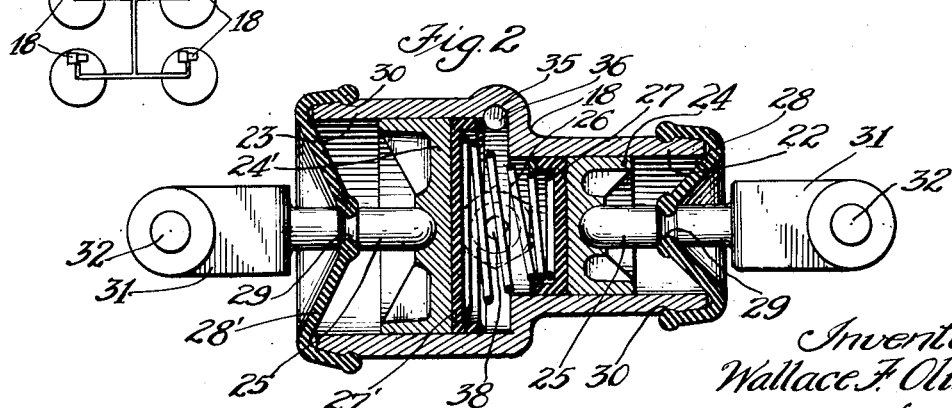
Inventor:
Wallace F. Oliver
By Williams, Bradbury, McCaleb & Hinkle
Attys.

Patented Sept. 4, 1934

1,972,829

UNITED STATES PATENT OFFICE 1,972,829

HYDRAULIC BRAKE

Wallace F. Oliver, Detroit, Mich., assignor to Hydraulic Brake Company, Los Angeles, Calif., a corporation of California Application January 10, 1930, Serial No. 419,788

6 Claims. (Cl. 188—152)

This invention relates to hydraulic brakes and more particularly to the type of brakes ordinarily employed by motor vehicles.

It has been determined from experience that considering all automobile drivers who may operate a vehicle, there is a practical limit of the length of stroke and the pressure which the manufacturer can count on to be applied to the brake pedal by the driver. The pressure and stroke determine the total energy available to be expended by the driver in the application of the brakes. In the ordinary type hydraulic brake in which the brake pistons, which are respectively connected to and operate the forward and the reverse shoes, are of the same size, the forward shoe produces about 80% of the total braking torque and the reverse shoe produces only 20%. It is apparent, therefore, that 50% of the energy exerted by the driver is expended in producing only 20% of the braking torque.

It is an object of this invention to take advantage of the inequality of braking torque normally exerted by the shoes, and since the total energy available is limited, to so construct a hydraulic pressure applying device such that the greater portion of the available energy is expended in exerting pressure on the more efficient shoe in order that the total braking torque will be greatly increased without the necessity of an increase in total applied energy.

Referring to the drawing illustrating one specific embodiment of my invention,

Figure 1 is a vertical section taken through the drum and on one side of the shoes looking toward the pan;

Figure 2 is a section taken longitudinally of the hydraulic cylinder for the purpose of more clearly showing the detail construction thereof; and Figure 3 is a schematic illustration of a hydraulic system as applied to the brakes of a vehicle.

As shown in Figure 1, the drum 1 may be of any usual construction and is adapted to cooperate with brake shoes 2 having a face 3 on which is secured brake lining 4 in the usual way. The brake shoes are adjustably pivoted on eccentric bolts 5 which are fixed to the pan 6 of any suitable design. The reinforcing flanges 6' of the shoes are provided with openings 7 through which pass bolts or pins 8 having washers 9 and cotter keys 10 for the purpose of guiding the brake shoes throughout their range of movement from on to off position of the brakes.

In order to limit the inward movement of the brake shoes, I provide cam members 11 pivoted to the pan 6 on pins 12. The peripheries of the cams engage the inner surface of the T portion of the shoes when the shoes are in their released position. As the lining 4 becomes worn, the cams 11 may be rotatably adjusted so as to prevent excessive lost motion upon the application of the brakes. For the purpose of immediately retracting the shoes upon the release of fluid pressure from the hydraulic pressure applying mechanism, I have provided a usual type of coil spring 13 engaging through ears 14 in the reinforcing flanges of the shoes.

In Figure 3 I have shown a braking pedal 15 through which force is applied to the piston of the master cylinder 16 from which extend hydraulic pressure lines 17 which lead to the various brake cylinders 18. As in the usual type of motor vehicle, there is a practical limit to the distance the foot pedal can be depressed from its position shown in Figure 3 to a position adjacent the floor boards 20. This distance being approximately uniform in all motor vehicles of standard make and the pressure which is normally applied being substantially uniform, the energy exerted by the fluid within the master cylinder 16 is substantially a predetermined amount.

Since the total amount of energy available for the application of the brakes is thus generally limited to an amount which can be determined by extensive experimentation, it has been found desirable in order to effectively operate the brakes of a motor vehicle, to apply this energy in such a way as to get the greatest possible efficiency and thereby produce the greatest possible braking torque on the rotating mechanism. It has been found that the forward brake shoe when given an application force equal to the force applied to the reverse brake shoe produces about 80% of the total torque produced by both of the shoes. From this it would seem desirable to apply the total energy available to the forward shoe, but in order to secure sufficient braking in case the vehicle is operating in the reverse direction it is desirable to apply a portion of the energy to the reverse shoe. This invention is so designed that sufficient energy is applied to the reverse shoe for stopping the vehicle when operating in a reverse direction, which is ordinarily at a relatively low speed, while at the same time applying the greater proportion of the available energy to the forward shoe so that the vehicle may be readily and easily stopped when moving forwardly at a high rate of speed.

In Figure 2 is specifically shown the hydraulic cylinder 18 employed in my invention for producing the desired results. The cylinder 18 is rigidly attached to the stationary pan 6 by lugs 18' and 19' and is provided with a relatively small bore 22 in one end and a relatively large bore 23 in the other end. A piston 24 fits in the bore 22 and is held against the end of piston rod 25 by a coil spring 26 engaging the flexible cup 27 which prevents the escape of fluid by the piston 24. For the purpose of preventing dust and dirt and the like from gaining entrance to the bore 22, I have provided a flexible boot 28 having a central portion fitting in an annular groove 29 in the piston rod 25 and having its outer end engaging in an annular recess 30 in the outer surface of the cylinder 18. The outer end of piston rod 25 is provided with a forked portion 31 having a pin 32 therethrough which engages adjacent the upper end of the shoe for forcing the same outwardly into contact with the drum.

In the larger bore 23 is provided a piston 24' which is identical with piston 24 except that it is larger to fit the bore in which it is positioned. In a similar way I have provided a flexible boot 28' and a cup 27' against which the coil spring 26 engages for holding the pistons in place on their respective piston rods. For the purpose of permitting air or gases to escape from the cylinder 18, I have provided a vent 35 which is normally closed by a pin 36 of usual design for such purposes. Liquid under pressure is admitted to the cylinder through a port 38 which leads from one of the conduits 17 as shown in Figure 3.

It is essential for the successful operation of my invention that the larger piston 24' be connected in such a manner that it actuates the forward brake shoe and that the piston 24 actuate the reverse brake shoe. I have shown the area of piston 24' substantially twice that of the area of piston 24. This increase in area of the piston which actuates the forward brake shoe, which is normally about four times as efficient as the rearward brake shoe, causes much greater torque to be exerted by the forward brake shoe, and instead of dissipating 50% of the energy to produce 20% of the braking torque, this device employs two-thirds of the energy on the brake shoe having the high efficiency. Thus it will be apparent that a much greater braking torque is produced without an increase in the total applied energy.

As used in the specification and claims, the expression "forward shoe" is to be interpreted as the shoe which is most efficient when the vehicle is moving ahead.

It will become apparent to those skilled in the art that other means may be devised whereby this advantage may be procured and my invention is not limited to the specific illustrations given in the drawing but includes such other devices as may come within the scope of the appended claims.

I claim as my invention:

1. In brake mechanism of the class described, the combination of a brake drum, forward and reverse brake shoes of substantially equal area, fluid motor means including a large piston connected to said forward shoe and a smaller piston connected to said reverse shoe whereby greater force will be applied to said forward shoe than to said reverse shoe, means for withdrawing said shoes from engagement with said drum, and stop means definitely determining the release position of said shoes.

2. In brake mechanism of the class described, the combination of a brake drum, forward and reverse brake shoes of substantially equal area, fluid motor means comprising a two diameter cylinder having large and small pistons therein, said large piston applying said forward shoe and said small piston applying said reverse shoe whereby a greater force will be exerted on said forward shoe than on said reverse shoe, means for withdrawing said shoes from engagement with said drum, and stop means definitely determining the release position of said shoes.

3. In brake mechanism of the class described, the combination of a brake drum, forward and reverse brake shoes of substantially equal area, fluid motor means including a large piston connected to said forward shoe and a smaller piston connected to said reverse shoe whereby greater force will be applied to said forward shoe than to said reverse shoe, a separate pivot for each of said shoes, said pivots being equally spaced from said drum, means for withdrawing said shoes from engagement with said drum and stop means definitely determining the release position of said shoes.

4. In brake mechanism of the class described, the combination of a brake drum, forward and reverse brake shoes of substantially equal area, fluid motor means including a large piston connected to said forward shoe and a smaller piston connected to said reverse shoe whereby greater force will be applied to said forward shoe than to said reverse shoe, means for withdrawing said shoes from engagement with said drum, and an adjustable stop normally engaging each shoe and definitely determining the release position thereof.

5. In brake mechanism of the class described, the combination of a brake drum, forward and reverse brake shoes, each of said shoes corresponding to substantially one-half of said drum, fluid motor means including a large piston connected to said forward shoe and a smaller piston connected to said reverse shoe whereby greater force will be applied to said forward shoe than to said reverse shoe, means for withdrawing said shoes from engagement with said drum, and stop means definitely determining the release position of said shoes.

6. In brake mechanism of the class described, the combination of a brake drum, forward and reverse brake shoes each corresponding to substantially one-half of said brake drum, fluid motor means comprising a double ended two-diameter cylinder having a large piston connected to said forward shoe and a smaller piston connected to said reverse shoe, separate pivots for said shoes, said pivots being equally spaced from said drum, a spring for withdrawing said shoes from engagement with said drum, and adjustable stops normally engaging said shoes and definitely determining the release positions thereof.

WALLACE F. OLIVER.